US011061568B2

(12) United States Patent
Breuer et al.

(10) Patent No.: US 11,061,568 B2
(45) Date of Patent: Jul. 13, 2021

(54) VARIABLE OPERATION TAPE PERFORMANCE

(71) Applicant: International Business Machines Corporation, Armonk, NY (US)

(72) Inventors: Marcus Breuer, Dalheim (DE); Frank Krick, Ockenheim (DE); Bernd Freitag, Partenheim (DE); Tim Oswald, Gimbsheim (DE)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/445,459

(22) Filed: Jun. 19, 2019

(65) Prior Publication Data
US 2020/0401319 A1 Dec. 24, 2020

(51) Int. Cl.
*G11B 19/02* (2006.01)
*G06F 3/06* (2006.01)

(52) U.S. Cl.
CPC .......... *G06F 3/0607* (2013.01); *G06F 3/0634* (2013.01); *G06F 3/0644* (2013.01); *G06F 3/0682* (2013.01)

(58) Field of Classification Search
CPC ............... G06F 11/004; G06F 11/1464; G11B 20/1816; G11B 17/22
See application file for complete search history.

(56) References Cited

U.S. PATENT DOCUMENTS

| | | | |
|---|---|---|---|
| 5,386,324 A | 1/1995 | Fry et al. | |
| 5,450,384 A * | 9/1995 | Dahman | G11B 17/22 360/48 |
| 7,006,317 B1 | 2/2006 | Hennecken et al. | |
| 7,971,093 B1 * | 6/2011 | Goel | G06F 11/004 714/6.22 |
| 2005/0052772 A1 * | 3/2005 | Barbian | G11B 27/329 360/69 |
| 2008/0133827 A1 * | 6/2008 | Topham | G06F 11/1464 711/111 |
| 2009/0059757 A1 * | 3/2009 | Haustein | G11B 20/1816 369/53.42 |
| 2015/0124348 A1 | 5/2015 | Bui et al. | |

\* cited by examiner

*Primary Examiner* — Ryan Bertram
*Assistant Examiner* — Trang K Ta
(74) *Attorney, Agent, or Firm* — Nolan M. Lawrence

(57) ABSTRACT

An access operation performed by a tape drive is detected. The access operation is performed on a tape medium. The access operation has one or more performance characteristics. The performance characteristics of the detected access operation are compared with one or more predefined performance thresholds. The comparison is in response to detecting the access operation. An operation performance of the tape medium is determined. The determination is based on comparing the performance characteristics with the predefined performance thresholds. A table associated with the tape medium is updated based on the operational performance of the tape medium. The table is stored in a non-volatile storage.

20 Claims, 6 Drawing Sheets

| | LPOS | WRAP# | Speed | C1 error | C2 error | Classification | Verification |
|---|---|---|---|---|---|---|---|
| 105-1 | 29 | 547 | 14 | 1 | 0 | High | verified |
| 105-2 | 43 | 625 | 14 | 10 | 0 | High | to be verified |
| 105-3 | 85 | 391 | 6 | 50 | 0 | Slow | verified |
| 105-4 | 19 | 5973 | 1 | 100 | 300 | Bad | to be verified |

FIG. 1

| LPOS | WRAP# | Speed | C1 error | C2 error | Classification | Verification |
|---|---|---|---|---|---|---|
| 29 | 547 | 14 | 1 | 0 | High | verified |
| 43 | 625 | 14 | 10 | 0 | High | to be verified |
| 85 | 391 | 6 | 50 | 0 | Slow | verified |
| 19 | 5973 | 1 | 100 | 300 | Bad | to be verified |

FIG. 2

Program 311

Analog to Digital Decode 342

Digital to Analog Encode 344

Input/output 346

Motor Control 350
- Linear Move 352
- Access Operation 354

Classification 360
- Slow Portion 362
- Bad Portion 364

Read Ahead 370

VARIABLE OPERATION TAPE PERFORMANCE

BACKGROUND

The present disclosure relates to tape drives, and more specifically, to tape drives for reading and writing computer data.

Tape drives may be used in commercial and industrial scenarios for backup and archival of company data. Tape drives may be used in non-commercial scenarios to provide a location for long-term storage of photos and other data. Tape drives use tape media that may be useful in comparison to other forms of storage media as the price per storage unit may be less than other media (e.g., optical discs, magnetic discs, flash storage).

SUMMARY

According to some embodiments of the present disclosure, disclosed are a method, system, and computer program product for improving tape performance. An access operation performed by a tape drive is detected. The access operation is performed on a tape medium. The access operation has one or more performance characteristics. The performance characteristics of the detected access operation are compared with one or more predefined performance thresholds. The comparison is in response to detecting the access operation. An operation performance of the tape medium is determined. The determination is based on comparing the performance characteristics with the predefined performance thresholds. A table associated with the tape medium is updated based on the operational performance of the tape medium. The table is stored in a non-volatile storage.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to tape drives; more particular aspects relate to tape drives for reading and writing computer data. While the present disclosure is not necessarily limited to such applications, various aspects of the disclosure may be appreciated through a discussion of various examples using this context.

Tape drives (drives) can be used for reading and writing computer data (such as digital data). Tape drives can be used to write to tape media (tape) of varying quality. For example, a tape medium can have one or more areas of bad or degraded read/write performance. The varying quality can be due to manufacturing defects, improper storage or handling, or environmental and time-based defects (e.g., aging).

Tape drives can be used for storing digital data that is readable and/or executable by computers. Data can be accessed (that is, read or written) on a tape medium. The tape medium can be elongated and includes the following: (i) a longitudinal direction—a direction along the length of the tape medium; (ii) a horizontal direction—the vertical thickness of the flat tape medium; and (iii) a transverse direction—a direction across the width of the tape medium. When performing data access operations, the tape medium can be actuated to move in the longitudinal direction with respect to a magnetic head (herein sometimes referred to as a "head") of the tape drive.

Data can be written to the tape medium in particular areas, or physical locations called portions. For example, a portion can be a designated area for specific reference to data that is stored on tape media. The portions can be referred to with one or more names, such as blocks, tracks, bands, wraps (WRAPs), and longitudinal positions (LPOS). In some situations, a combination of names can reference a portion. For example, a combination of a wrap can define a transverse location of a given tape medium and a LPOS can define a longitudinal location of a given tape medium that contains a specific element of data.

Servomechanisms in tape drives can include several components, such as: (i) mechanical parts; (ii) transducers; and (iii) signal-processing units implemented by logical circuits. For example, in a track-follow servomechanism for some tape drives, a coarse actuator and a fine actuator can be used for the transverse (sometimes herein referred to as lateral) positioning of a rigid tape head module relative to the pliable tape medium. The tape head module can include: (i) data write and read elements; and (ii) servo read elements—alternatively, servo elements. Another component of tape drives, called a skew actuator, can tilt the tape head module to be angularly aligned during access (sometimes herein referred to as read, write, write/read, or read/write) operations. One or multiple servo elements that are part of the tape head module can provide servo signals to respective servo channels for computing estimates of tape velocity and longitudinal tape position as well as a lateral tape head position, also known as transverse position, with respect to the tape. A controller can determine digital control signals for actuators such as an actuator for moving the tape head module as a whole in the transverse (sometimes herein also referred to as the lateral) dimension.

Stored data on a tape medium can be arranged into WRAP/LPOSs and data tracks (e.g., 0.3 bands by linear tape open). The stored data can be read/written into both the forward and backward movement direction of a given tape (e.g., longitudinal direction). In some circumstances, tape drives can "keep on track" (e.g., achieve and maintain a correct transverse or "vertical" position relative to the tape medium) through dedicated servo heads. The servo heads of the tape drive can be located, respectively, over and under the tape medium in the thickness direction, which provide positional feedback based upon magnetic reference signals transduced from the tape medium by the servo heads.

When performing a data access operation, data can be written and immediately read to check consistency. For example, tape drives can include one or more first heads and one or more second heads. If the tape medium is being written in a first direction, the first heads can be referred to as leading heads for writing of data (write heads). Respectively, the second heads can be referred to as trailing heads for reading of data (read heads). If the tape medium is being written in a second direction, the second heads can be referred to as leading heads for writing of data. Respectively, the first heads can be referred to as trailing heads for reading of data. To immediately read data that is written, a leading head can write data and substantially contemporaneously (e.g., just afterwards) a trailing head can read the written data.

In some situations, reading and writing of data can lead to issues related to tape drive and tape media performance. Tape drives can operate by handling all regions of the tape equally during read and write operations. If the tape medium is mounted in another drive, no information about regions with uncorrectable errors or bad read/write performance will be transferred to the new drive. Tape media is also highly variable. For example, a given tape medium can have regions of good performance alternate with areas of a repeating error pattern. The repeated error patterns can lead to a large number of stops, starts, and retries together with decreasing the speed of the given tape medium.

One issue with current tape drives relates to tape drive longevity and wear. The operation of writing and immediately reading can be performed at a defined speed, sometimes referred to as a "normal speed," "full speed," or "high speed." If data cannot be read, the tape is fully stopped, rewound, stopped again, and actuated to move forward to read the data again at lower speed. This process is sometimes called a "full stop" process. This full stop process may be repeated with several different speeds until data can be read or the slowest possible speed is reached. This repeated process decreases the performance of the tape drive and causes erosion of the drive.

Another issue is lower overall read and write performance of a tape drive. In some situations, the tape drive may have to slow the read and/or write speed to enable the success of reading and/or writing to a particular portion of a tape medium that is degraded. After slowing, the tape drive returns to a normal speed for any future operation. Rarely, if ever, is a given tape medium degraded only at a singular portion of the tape medium. The earlier described full stop repeats the next time a degraded portion of the tape medium is accessed. Information about read and write speeds of the tape medium is not retained and the procedure of determining the performance of each portion is repeated, slowing read and write performance.

Another issue is that some of the procedures to determine the performance characteristics of a tape medium can take significant time to complete or can prematurely flag a portion as bad. For example, some tape drives can perform between ten and twenty various tests to ensure that data is successfully stored on a portion of a given tape medium. If just one of those tests fail, then a given area is marked as slow or bad. Again, if a given tape medium is reused, then the suites of tests need to be performed all over again to reidentify the slow or bad sections. In another example, some tape drives can mark an entire portion of a tape medium as bad if just one of tens of tests fail without testing if lower-speed operation yields successful storage of data.

Yet another issue is the reduced longevity of tape media. For example, the tape drive does not know the read and write speed of a given tape medium each time the given tape medium is accessed. The operations of the tape drive to determine an acceptable read and/or write speed of a degraded portion involve additional read and write operations that add to the wear of the tape medium.

Embodiments of the present disclosure are directed to operating a tape drive by storing information about a given tape medium that includes the characteristics of various portions of the tape medium. The information may be stored in the form of a database. The characteristics of the various portions may include the ability to read from, write to, or otherwise access a given portion of a given tape. The information regarding the characteristics of the various portions of the tape medium may be stored in a non-volatile memory (memory). The information may be stored directly, such as in a non-volatile storage, or memory integrally coupled to a cartridge of the tape medium. The information may be stored in the tape drive, such as in a disk drive or other non-volatile memory that forms part of the tape drive. The information may be stored in a separate computing device communicatively coupled to the tape drive and other tape drives, such as a network-connected computer system having a memory separate from any tape drive or tape media.

In some embodiments, a tape drive system may include a transducer (for example, a magnetic head arrays/separation shield) located in a recess of a transducer housing (for example, supporting rails, a U-shaped carbon tape guide). The tape drive system may further include tape guiding rollers which guide the tape during seek operations and/or data access operations (that is, read/write operations). During write operation portions which can't be read in the verification process may be marked as "bad" WRAP/LPOS in a memory. Portions which can be read but not with full speed may marked as "slow" WRAP/LPOSs in the memory.

In some embodiments, the tape drive may read, ahead of performing other commands, the information in the memory to determine the tape operation performance parameters of various portions of a given tape medium. In a first example, the tape drive may read the information in memory and skip the WRAP/LPOSs previously marked as "bad" WRAP/LPOSs during write operation. In a second example, the tape drive may read the LPOS information in the memory and slow down the tape medium transport speed for WRAP/LPOSs previously marked as "slow" WRAP/LPOSs during read operation. By skipping ahead of marked "bad" portions based on information in the memory and by preemptively slowing down marked "slow" portions based on information in the memory, full stop, rewind, and read again operations may be avoided.

Some embodiments may realize features, characteristics and advantages in the operation of tape drives. For example, tape drive operations may include the following: (i) marking (alternatively, identifying) portions as bad and storing the information into a memory concurrently with normal read and write operation; and (ii) marking portions as slow and storing the information in the memory concurrently with normal read and write operation. Tape drive advantages associated with embodiments may include the following: (i) a significant increase of write performance by reading ahead the bad portion information from the memory and skipping bad portions; (ii) a significant increase of read performance by reading ahead the slow portion information from the memory and adjust the winding speed of the tape to the read quality of the media area to be read; and (iii) a significant increase of overall performance by classifying slow portions as bad portions to prevent further writes. Further, implementation of the features and characteristics may be implemented into a wide range of magnetic tape drives because the additions do not require many additions or mechanical adjustments. For example, a thirty-two head tape drive may implement embodiments of the disclosure.

Figure 1:
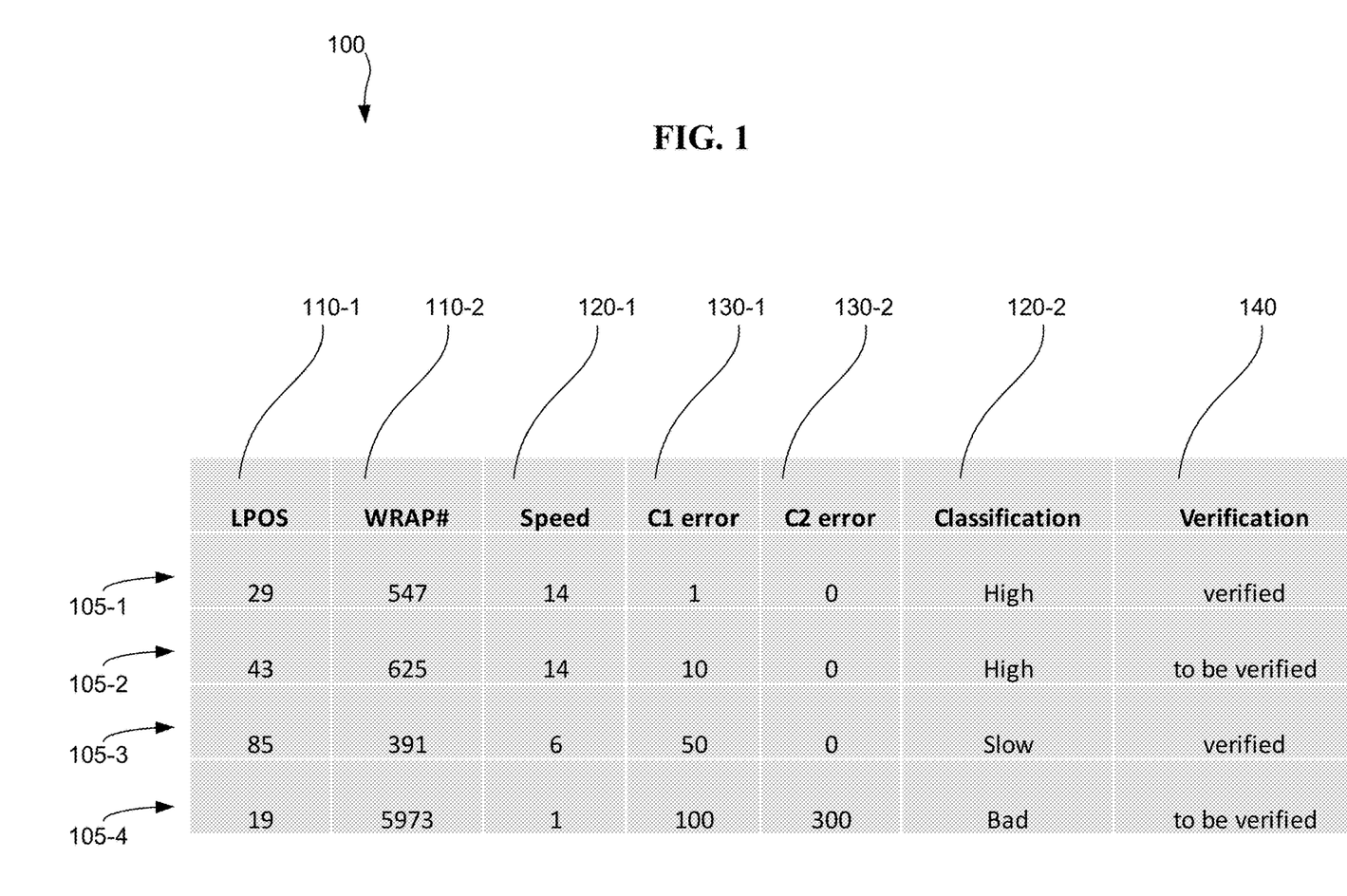
FIG. 1 depicts an example table for storing one or more performance characteristics of tape media, consistent with some embodiments of the disclosure.

FIG. 1 depicts an example table 100 for storing one or more performance characteristics of tape media, consistent with some embodiments of the disclosure. Table 100 may be stored in a memory (not depicted). The memory may be non-volatile, such that if electrical power is not provided to the memory, the data in table 100 remains available at a later time. The memory may be integrated into the tape cartridge. For example, a given tape medium may be in a plastic housing or cartridge and a memory may be integrally mounted into the cartridge. The memory may be in a separate computer or a tape drive. Table 100 may be associated with a specific tape medium (e.g., a first tape medium having a first serial number). Table 100 may include characteristics about the associated tape medium, such as the operational performance of the associated tape medium. In some embodiments, performance thresholds for determining operational performance of an associated tape medium may be stored in table 100. Table 100 may be accessed later to determine one or more tape operation performance parameters, such as when and at what portion of a given tape medium to slow the speed of reads or writes or to skip a specific portion of the given tape medium.

Table 100 may be updated during a normal access operation of the tape drive. A normal access operation may include any of the following related to a given tape medium: a read, write, write/read, or read/write operation. For example, a write operation may be performed by a leading write head of a tape drive and a read operation substantially concurrently may be performed by a trailing read head. Based on the performance characteristics of the read or write table 100 may be updated. For example, table 100 may be updated based on a drive performing a write operation that can be read only at a reduced or slowed speed at a specified portion. In another example, table 100 may be updated based on a drive being unable to read data that was written at a specified portion.

Table 100 may include plurality of characteristics, represented in the form of columns. Table 100 may also include a plurality of entries 105-1, 105-2, 105-3, and 105-4 (collectively, 105), represented in the form of rows. Each of the entries 105 correspond to a location in table 100 that may contain one or more characteristics regarding the operational performance of a portion of a given tape medium. In some embodiments, a given tape medium associated with table 100 may operate at a default speed in the absence of an entry 105. For example, entry 105-3 may include characteristics that a particular portion can still successfully be read and written to but may need to operate at a slower speed. The absence of an entry 105 within table 100 may indicate that a given portion of a tape related to table 100 has yet to be read from or written to or is otherwise considered unclassified. The absence of an entry 105 may indicate that a given portion of a tape related to table 100 was successfully read from or written to at a normal or full speed, or without any or many errors.

Table 100 may include a longitudinal position (LPOS) characteristic 110-1 and a wrap number (WRAP #) characteristic 110-2 (collectively, portion characteristics 110). The portion characteristics 110 may provide information related to where a given operational performance occurred and, consequently, is recorded with respect to a given tape medium. In some embodiments, the portion characteristics 110 may identify a single physical area longitudinally and transversely where a given operational performance is known about a tape medium. For example, a given entry 105 may include a LPOS 110-1 value that provides a longitudinal position and a WRAP #110-2 value that provides a transverse position across a given tape medium. In some embodiments, the portion characteristics 110 may identify multiple physical locations that share a similar operational performance of a tape medium. In embodiments that identify multiple physical locations, additional portion characteristics (not depicted) may be included in table 100. In a first example, an additional end longitudinal position or ELPOS (not depicted) may be a portion characteristic 110 that defines an ending portion, and between an LPOS 110-1 and a corresponding ELPOS a given tape medium has similar operational performance. In a second example, an additional range longitudinal position or RLPOS (not depicted) may be a portion characteristic 110. The RLPOS may define several LPOSs sequentially starting from a given LPOS 110-1 that contain similar operational performance.

Table 100 may include a speed characteristic 120-1 and a classification characteristic 120-2 (collectively, performance characteristics 120). The performance characteristics 120 may identify the operational performance of a given tape medium. For example, the performance characteristics 120 may identify how data is read, written, or otherwise accessed at a portion of a given tape medium. The speed characteristic 120-1 may indicate the maximum speed of a previously successful read, write/read, or other access operation. The classification characteristic 120-2 may be a categorical rating of the tape medium. The classification characteristic 120-2 may be based on the speed characteristic 120-1. The classification characteristic 120-2 may be provided by a tape drive or other tape system consistent with some embodiments. The performance characteristics 120 may only indicated when operational performance is below normal operation.

For example, a tape drive may default to operating at full speed or normal speed when accessing a given tape medium. Without any entries 105 in table 100 associated with the tape medium that are directed to portions, the tape drive may operate at the normal speed. Based on a request to access a portion of the given tape medium that does have an entry 105, the tape drive may operate at a lower speed or skip the portion. There may be four categories of speeds: no entry in table 100 corresponding to normal speed; an entry of "High" corresponding to a fairly high access speed that is lower than normal speed; an entry of "Slow" corresponding to a fairly low access speed that is significantly lower than normal speed; and an entry of "Bad" corresponding to an access speed that is unacceptable. In some embodiments, the classification characteristic 120-2 may cover a range of speeds, such as a speed in the range of "12" to "15" corresponding to a "High" classification.

Table 100 may include one or more error characteristics, including a C1 error 130-1 and a C2 error 130-2 (collectively, 130). The error characteristics 130 may include information about the number and/or kind of errors that have occurred at a given portion of an example tape medium. The C1 error 130-1 and C2 error 130-2 may be a type of relevant error that occurs when reading, writing, or otherwise accessing a given tape medium. The C1 error 130-1 and C2 error 130-2 may be determined and written to table 100 by a tape drive during operational performance of reads and writes. In some embodiments, additional columns (not depicted) may be included in table 100 that are related to other errors relevant in tape media. In some embodiments, the classification characteristic 120-2 may be based on the error characteristics 130.

Table 100 may include a verification characteristic 140. The verification characteristic 140 may include information related to whether one or more of the performance characteristics 120 have been verified consistent with some embodiments. The verification may be performed by a tape drive or other computer system communicatively coupled to a tape medium. The verification characteristic 140 may be a status "unverified" or "to be verified" if only one or two accesses are performed at a specific portion. The verification characteristic 140 may be a status of "verified" if multiple accesses are performed at a specific portion and yield similar operational performance, such as two or more accesses yielding similar performance characteristics. The verification may include multiple consistent performance characteristics 120 and/or error characteristics 130 at a particular portion characteristic 110. For example, entry 105-2 may indicate that at LPOS 43 and WRAP #625 there are 10 C1 errors based on column 130-1 of table 100. Entry 105-2 may not yet be verified as the access operations may only have these C1 errors during performance a first time. If future access operations are performed at portion LPOS 43 and WRAP #625, then the verification status may be updated to verified.

A "verified" status may provide additional technical benefits aside from increasing the performance of reading to a given tape medium. For example, a first tape medium may include an entry with a "verified" verification characteristic for a given portion of the first tape medium by operating in a first tape drive. The first tape medium may be inserted into a second tape drive and the given portion of the first tape medium may operate differently in the second tape drive. Errors or malfunctions of the second tape drive may, consequently, be identified utilizing table 100 and the first tape medium. In some embodiments, verification characteristics may include additional characteristics (not depicted). For example, a given characteristic related to verification may include the number of times a verification has been stored. In another example, a serial number, a model number, or other relevant number, of a given tape drive may be stored as a verification characteristic.

Figure 2:
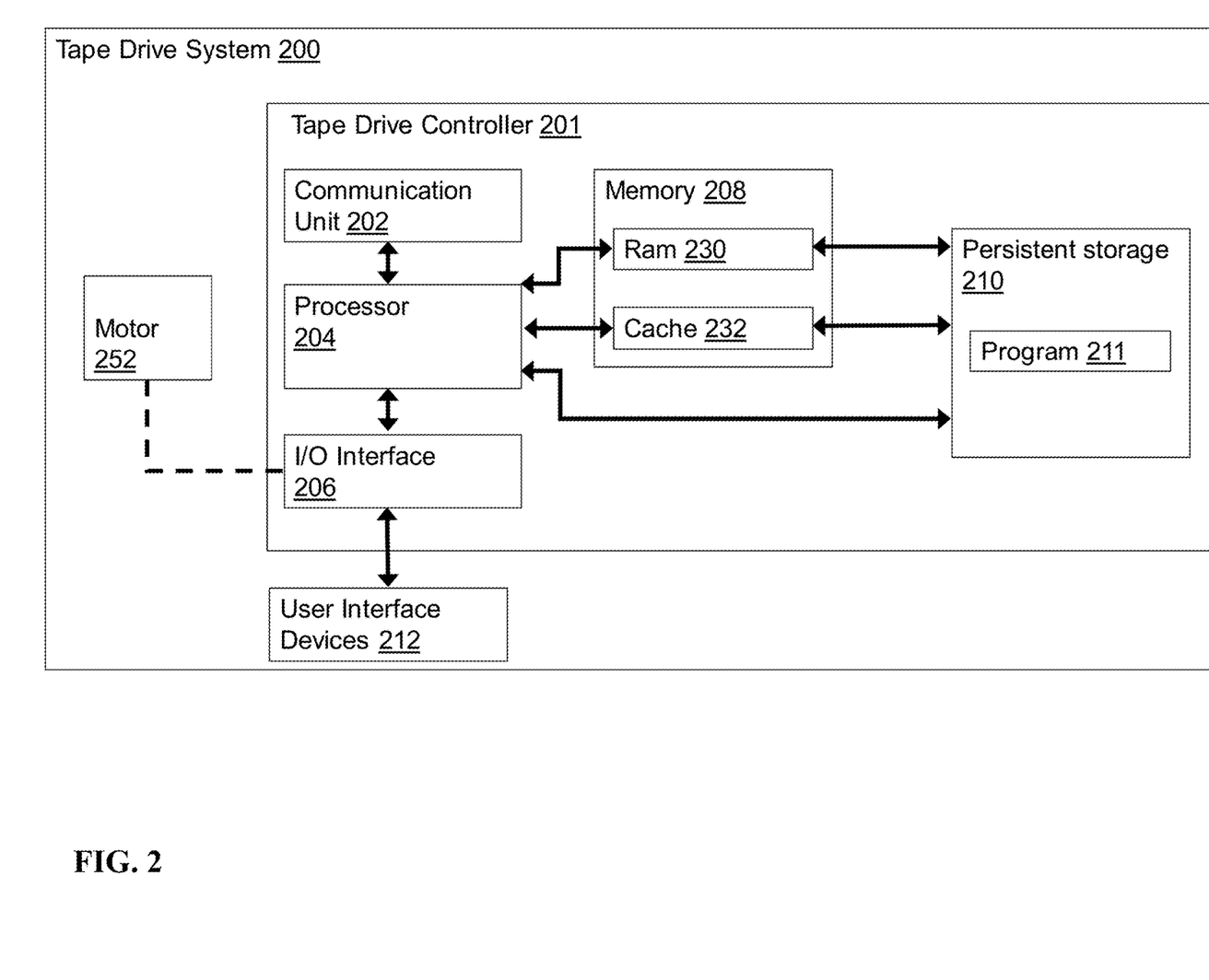
FIG. 2 depicts an example tape drive system consistent with some embodiments of the disclosure.

FIG. 2 depicts an example tape drive system 200 consistent with some embodiments of the disclosure. Tape drive system 200 may include: tape drive control computer (controller) 201; user interface devices 212; and transducer housing motor 252. Tape drive controller 201 may be an embedded system, such as a single chip system, embedded microcontroller, or other application specific integrated circuit. Tape drive controller 201 may be a circuit board with disparate components. User interface devices 212 may include input or output device communication for user interaction. For example, interface devices 212 may include a keyboard, mouse, printer, and display screen.

Tape drive controller 201 may include a plurality of components. In some embodiments, tape drive controller 201 includes: communication unit 202 (for communicating over networks, like the Internet); processor 204 (for example, a single chip central processing unit); input/output interface 206 (for communicating with peripheral devices); volatile memory 208 (including random access memory 230 and off-chip cache 232); and persistent storage 210 (including program 211). Program 211 may be configured for performing one or more embodiments of the disclosure. Program 211 may be stored and updated within memory of the tape drive system 200. Program 211 may be stored in a separate computer and may be updated and retrieved by the tape drive system 200 from the other computer (e.g., by sending and receiving data with communication unit 200 to a local area network to a server).

Figure 3:
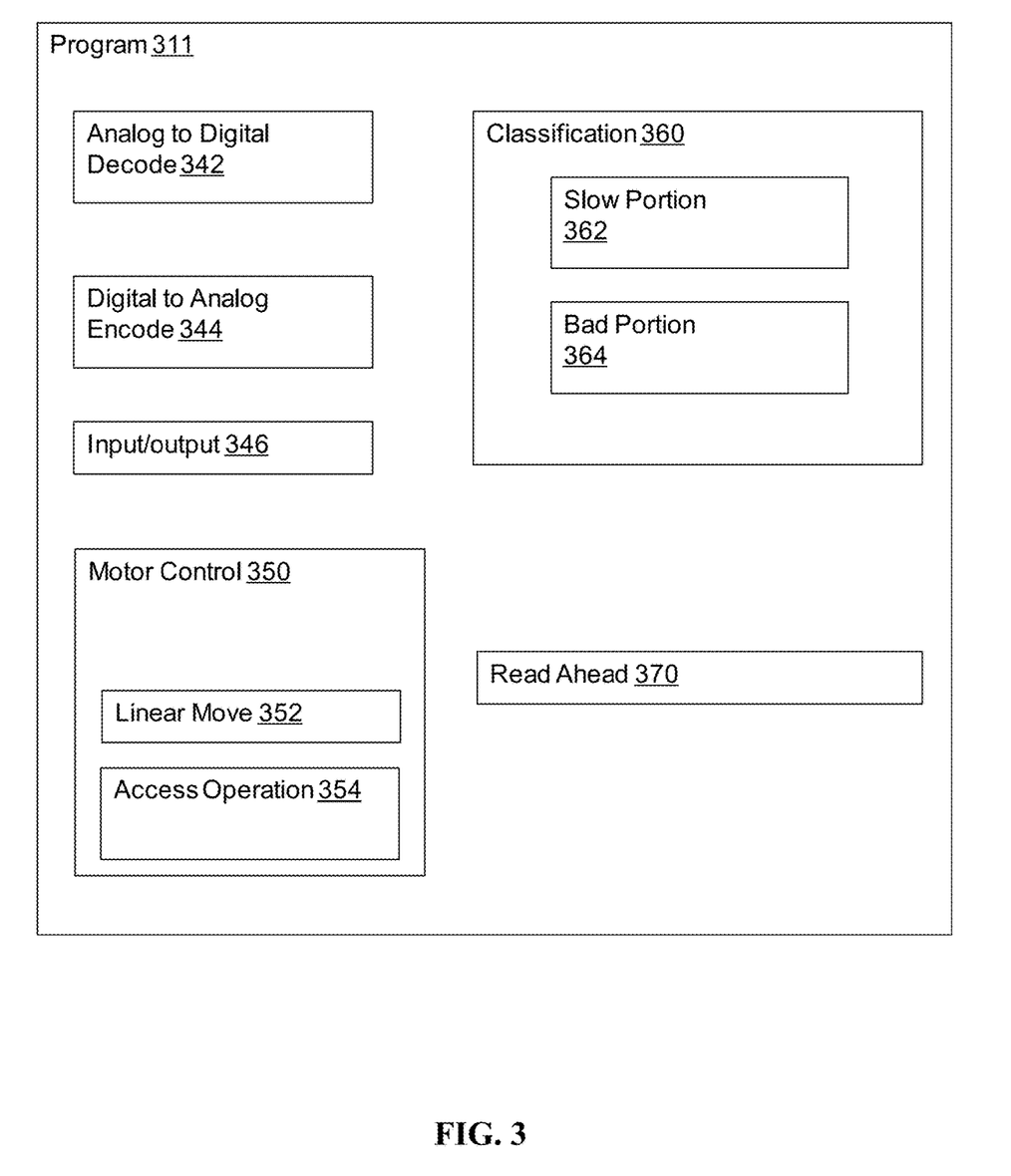
FIG. 3 depicts program for performing one or more operations of a tape drive consistent with some embodiments of the disclosure.

FIG. 3 depicts program 311 for performing one or more operations of a tape drive consistent with some embodiments of the disclosure. In some embodiments, program 311 corresponds to program 211 depicted in FIG. 2. Program 311 may be a software loaded from a memory of the tape drive. Program 311 may be software embodied in a fixed function specific integrated circuit. Program 311 may be in the form of a firmware application capable of being updated. Program 311 may include: analog-to-digital decode module ("mod") 342; digital-to-analog encode mod 344; input/output mod 346; transducer housing motor control mod 350 (including linear move sub-mod, 352, and access operation sub-mod, 354); classification module 360; and read ahead module 370.

During write operations a given transducer may transduce electrical signals, received from digital-to-analog encode mod 344 to a magnetic field suitable for writing data to a given tape medium by way of input/output mod 346. For example, in tape drive system 200 data may flow through processor 204 to input/output interface 206 to a motor 252 and a given tape medium. During read operations a given transducer may transduce electric signals, received from a given tape medium, that are sent to analog-to-digital decode mod 342, by way of input/output mod 346. For example, in tape drive system 200 data may flow through input/output interface 206 from a transducer to processor 204.

Motor control mod 350 may control physical movement of tape media (e.g., winding, unwinding, spooling, accessing, seeking) to facilitate access of data. Motor control mod 350 may control the longitudinal position of tape media by way of the linear move sub module 352. Motor control mod 350 may control read or write of data of the transducer by way of access operation sub module 354.

The classification module 360 and the read ahead module 370 may be software programs running on a tape drive controller. For example, classification mod 360 and read ahead mod 370 may be stored in persistent storage 210 and read into memory 208 to be processed by processor 204 of tape drive controller 201. Classification mod 360 may consist of plurality of sub modules. For example, classification mod 360 may include slow WRAP/LPOS (portion) sub-mod 362 and bad WRAP/LPOS (portion) sub-mod 364. Though the sub modules of classification module 360 may discuss a WRAP and LPOS, other embodiments are contemplated. In some embodiments, sub modules may mark as slow or bad a given tape based on various segmentations of the tape, such as blocks, tracks, sectors, or linear position/transverse position combinations. The classification module 360 and the read ahead module 370 may have elevated privileges. For example, classification module 360 and read ahead module 370 may have access to cache 232, or ram 230, or any other portion of memory 208 or persistent storage 210.

The classification module 360 and the read ahead module 370, may interact with a database or other data structure for storing one or more performance characteristics that are associated with a given tape medium. For example, classification module 360 may read from and update table 100 discussed in FIG. 1. The data structure may be embedded in various storage devices, such as, but not limited to a cartridge memory, a computer/mobile device, a networked server, or a cloud storage service. Reading to a database or other data structure may occur responsively to a request from a tape drive system. For example, in response to tape drive system 200 receiving a write request operation from I/O interface 206, read ahead module 370 may retrieve values from Memory 208.

During operation, based on program 311, if a tape speed should be reduced, the slow portion sub-mod 362 may instruct tape drive system 200. For example, the slow portion sub-mod 362 may retrieve from memory 208 or persistent storage 210 performance characteristics stored in a table. Further, the slow portion sub-mod 362 may update operational performance of a table associated with the tape when the read or write speed at a given portion is below a threshold or minimum value.

During operation, based on program 311, if a tape cannot be read at a specified portion, the bad portion sub-mod 364 may update operational performance values in a memory associated with the tape. In a first example, a table stored in persistent storage 210. In a second example, in a memory of a housing of the tape. The bad portion sub-mod 364 may, after a speed reduction or during a read operation, calculate the performance of the WRAP/LPOS of a given tape by reading the error rate and read speed from a performance table. The Bad Portion sub-mod 364 may determine based on specific minimum values, if a portion will be marked as bad. The values used for determination of performance may vary between different tape media and tape drives. In a first example, the material, brand, grade, or age of a given tape medium may vary the levels acceptable between a, good, slow, or bad portion of a medium. In a second example, a given tape drive may be a consumer grade or professional class tape drive.

During operation, based on program 311, read ahead module 370 may help increase performance of a tape drive system, such as tape drive system 200. Upon receiving an access request, read ahead module 370 may access a data structure with records that were previously updated by slow portion sub module 362 or bad portion sub module 364. For example, a table associated with a given tape medium having one or more characteristics that describe the performance of various portions of the given tape medium. The read ahead module 370 may enable transparent operation of a tape drive system. For example, a tape drive may receive a command from a host computer or other computer system, such as a locate command. In response to the command received from the host computer, the read ahead module 370 may access a table or other data structure associated with a given tape medium (e.g., a table similar to FIG. 1). Based on the data located in the table, the read ahead module 370 may determine that a given access request is pointed to a portion that is bad. The read ahead module 370 may further calculate the proper portion (e.g., the next WRAP/LPOS after the WRAP/LPOS marked bad in the table) and forward the proper seek operation (to the next non-bad portion). The operations of read ahead module 370 may save write cycles to portions of tape media that cannot be stored.

Figure 4:
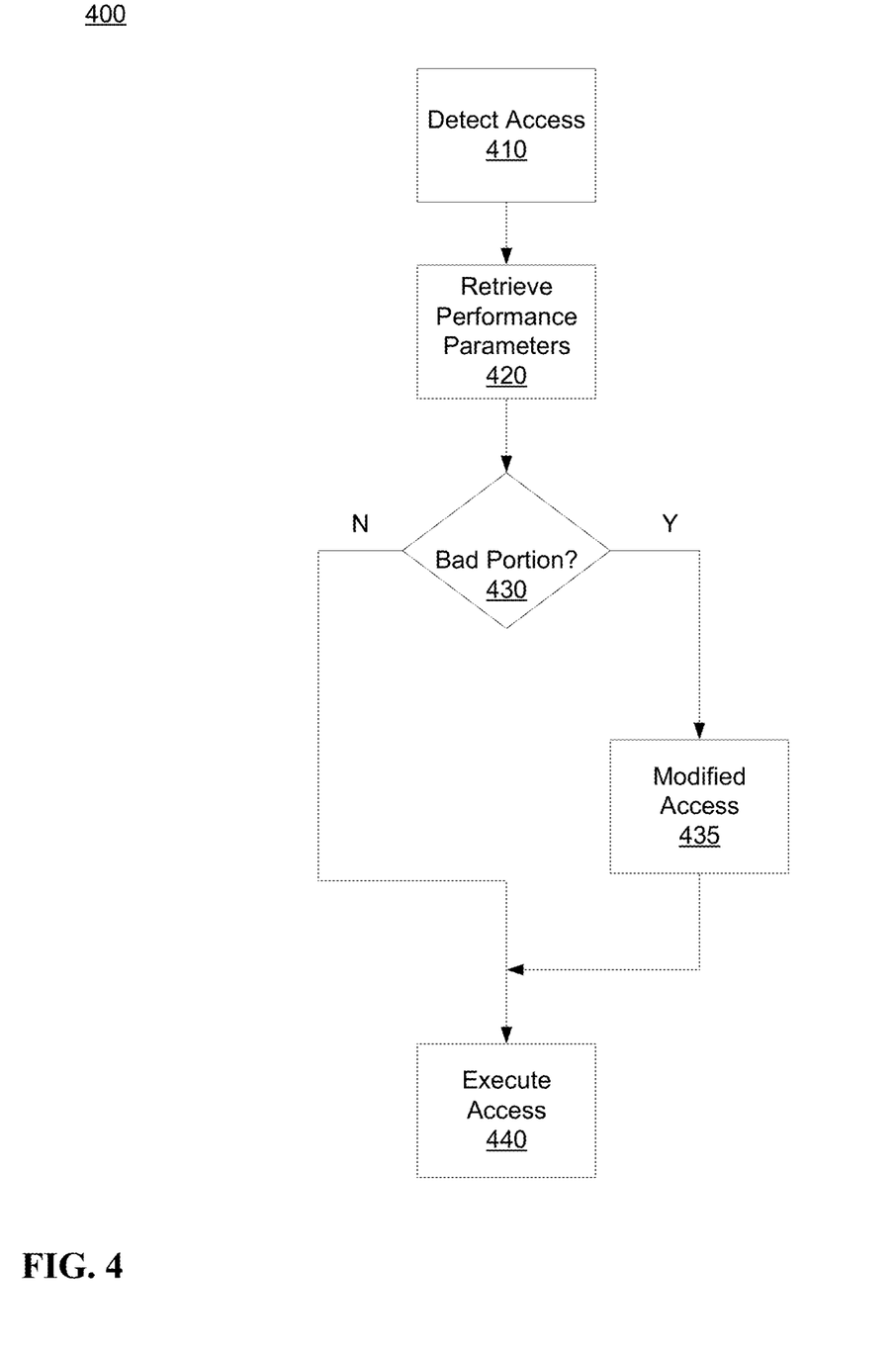
FIG. 4 depicts a flow diagram of an example method for performing access commands consistent with some embodiments of the disclosure.

FIG. 4 depicts a flow diagram of an example method 400 for performing access commands consistent with some embodiments of the disclosure. Method 400 may be executed by a computer system directly, such as a tape drive controller or other logic embedded or otherwise integrated into a tape drive system. Method 400 may be executed by a computer system indirectly, such as by a first computer communicatively coupled by a network (e.g., a local area network, the Internet) to a tape drive. FIG. 2 discloses an example tape drive system 200 capable of performing one or more operations of method 400 consistent with some embodiments of the disclosure.

Method 400 begins by an access operation being detected at 410. An access operation may be detected, at 410, by receiving a request to perform an access operation against a tape medium. An access operation may be detected, at 410, by retrieving from a queue (such as a command queue) one or more access operations and performing them in order (e.g., a first in first out order). An access operation may be a singular operation, such a read operation, a seek operation, a spool operation, or a write operation. An access operation may be a combination of operations, such as a write/read operation. The access operation, detected at 410, may be directed to a specific target of a tape drive. For example, a tape medium may contain WRAP/LPOS for a transverse/longitudinal position of data. The access operation, detected at 410, may be in a format specific to the tape medium (e.g., WRAP='47' and LPOS='156'). The access operation, detected at 410, may be in a format non-specific to a tape medium. For example, a detected access operation may be directed to a first bit or a "LOCATE" command to value "(0x92)," and the detected access operation may be converted to a tape-drive specific format.

A set of operational performance parameters may be retrieved at 420. The set of operational performance parameters may include one or more characteristics regarding a particular portion of a tape. For example, a determination of "bad" portion and a number of errors related to the portion of a tape. The one or more characteristics may be located in a non-volatile storage (e.g., a disk, a flash memory). The one or more characteristics may be organized into a defined data structure, such as a table with entries based on bad or slow performance of a particular portion. The set of operational performance parameters may include one or more instructions that are stored in a program or other executable related to the operations that should be performed in response to a characteristic stored in non-volatile storage. For example, a program, module of a program, or other routine in a firmware of a tape drive may be retrieved along with a characteristic.

If the detected access is directed to a portion of a tape medium, at 430, a modified access operation may be performed at 435. The modified access operation, at 435, may be a seek operation, such as when a portion is unable to store data. The modified access operation, at 435, may be a speed adjustment operation, such as slowing the read speed when a portion can only be written to slowly. The modified access operation, at 435, may be based on the set of operational performance parameters. For example, a tape drive may determine from a table a portion specified in the detected access, at 410, as the next good portion. The next good portion may be the next portion specified in the table that indicates that a next portion is slow. The next good portion may be a portion of a given tape medium that is unspecified. The tape drive may determine from the performance characteristics, retrieved at 420, that a range of portions are bad (e.g., WRAP 36, LPOS 191 to 194). The retrieved performance characteristics may include a single portion (e.g., a specific WRAP/LPOS value) and may perform the modified access operation, at 435, by incrementing the portion (e.g., incrementing the WRAP value, incrementing the LPOS value). After performing the modified access operation, at 435 (or if there is no bad portion detected, at 430), the access command may be executed at 440.

Execution of the access command, at 440, may include providing the detected access command, at 410, unaltered to a module or component of the tape drive (e.g., when there is no bad portion, determined at 430, spooling or seeking to the location in the detected access command). Execution of the access command, at 440, may include providing a modified access command. For example, data achieved from the modified access operation, at 435, may be combined with the detected access command, at 410. In some embodiments, the combining may include one or more values referencing to an original portion of the tape medium in the access command, detected at 410, being added with the data retrieved as part of the modified access operation, performed at 435.

In some embodiments, the combining may include one or more values referencing to an original portion of the tape medium in the access command, detected at 410, being shifted by the amount modified at 435. Execution of the access command, at 440, using the modified access command, at 435, may result in improved performance. For example, skipping the one or more read or write events and error testing of a bad portion, determined at 430. After the access command is executed, at 440, method 400 ends.

Figure 5:
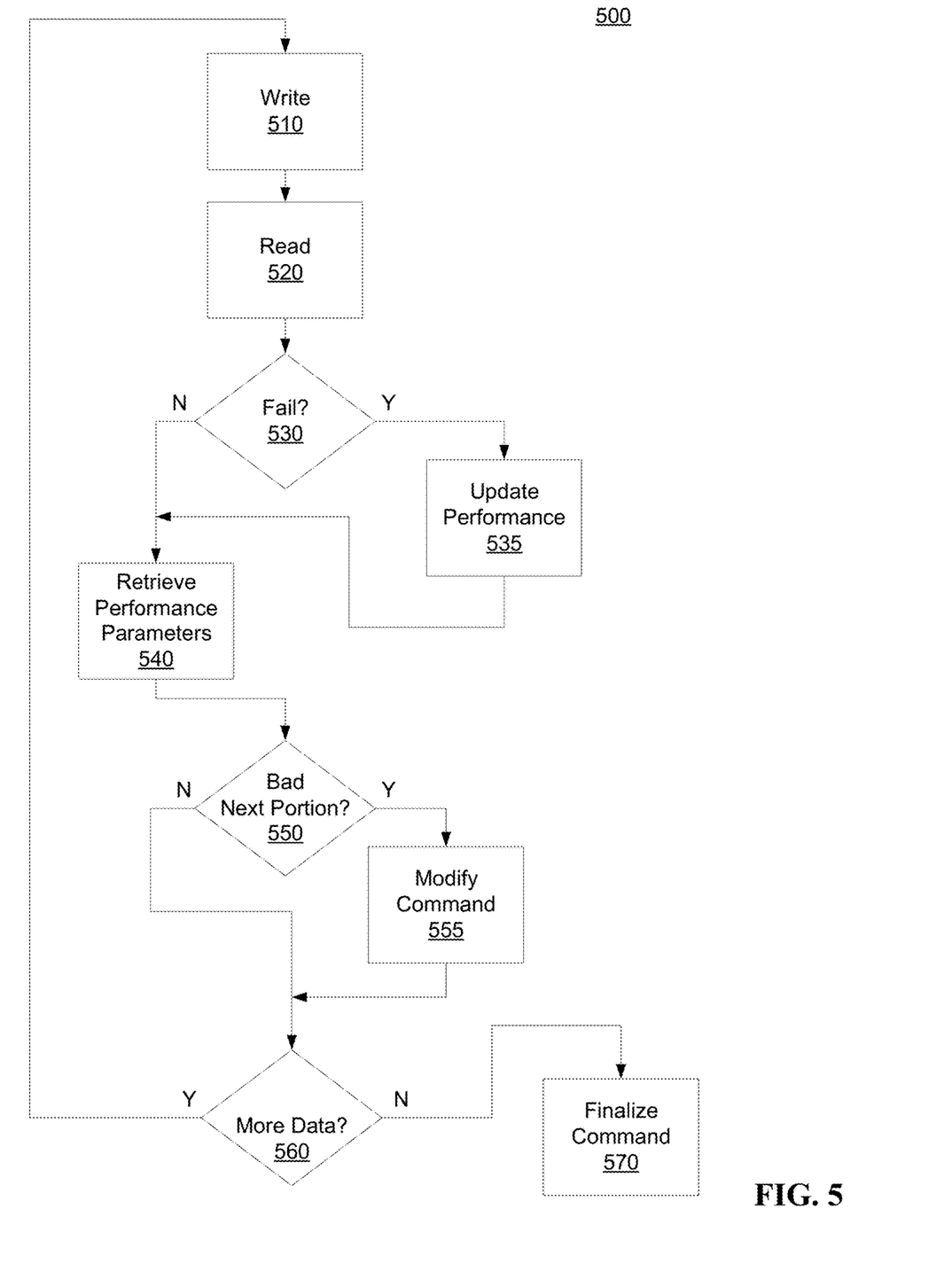
FIG. 5 depicts a flow diagram of an example method for performing access commands consistent with some embodiments of the disclosure.

FIG. 5 depicts a flow diagram of an example method 500 for performing access commands consistent with some embodiments of the disclosure. Method 500 may be executed by a computer system directly, such as a tape drive controller or other logic embedded or otherwise integrated into a tape drive system. Method 500 may be executed by a computer system indirectly, such as by a first computer communicatively coupled by a network (e.g., a local area network, the Internet) to a tape drive. FIG. 2 discloses an example tape drive system 200 capable of performing one or more operations of method 500 consistent with some embodiments of the disclosure. In some embodiments, method 500 may be performed after other disclosed operations. For example, method 500 may be performed after a skip ahead or seek to an unclassified portion of tape, such as performed by method 400.

Method 500 begins by a write operation being detected at 510. The write operation, at 510, may be performed by a first head of a tape drive. For example, a leading head of a tape drive in the orientation of the linear movement or spooling of the tape by the tape drive may perform writing. The data to be written, at 510, may be received from a peripheral directly attached to a tape drive system, such as a locally attached disk drive. The data to be written, at 510, may be received from a network, such as a remotely connected computing device. The data to be written, at 510, may be stored in a que, cache, or other memory.

At 520 a subsequent read operation is performed. The read operation, at 520, may be performed by a second head of a tape drive. For example, a trailing head of a tape drive in the orientation of the linear movement or spooling of the tape by the tape drive may perform reading. The read operation, at 520, may be performed at a similar time to the write operation, at 510. For example, a read operation may be performed just after a linear tape passes beyond a write head and reaches a read head.

At 530 it is determined whether the write operation failed. Determining a failure, at 530, may be based on comparing the data of the write operation, at 510, with the data read, at 520. For example, by comparing the data read from a tape medium by a trailing tape drive head of a tape drive to data from a memory of the tape drive system that was stored in a memory and used to perform a write operation. Determining a failure, at 530, may be based on detecting the presence of number of errors of the written data (e.g., the number of C1 errors).

If there is a failure, at 530, one or more performance characteristics may be updated at 535. Updating performance characteristics, at 535, may include recording the number of errors detected based on comparing the writes and the reads. Updating performance characteristics, at 535, may include recording the last speed used to successfully write records to a given portion of tape medium. Updating performance characteristics, at 535, may include recording that a write was unsuccessful (e.g., an unsuccessful write because the written data could not be read no matter how slowly the write was performed). Updating performance characteristics, at 535, may include recording a performance characteristic in a classification format (e.g., high, slow, very slow, bad). In some embodiments, updating performance characteristics, at 535, may include updating a verification characteristic (e.g., marking an entry in a table as verified if the entry already existed). Updating the performance characteristics, at 535, may improve performance, such as by preventing future write attempts to avoid unnecessary wear on tape drives and tape media.

If the write operation did not fail, at 530 (or after performance characteristics are updated at 535), operational performance parameters related to a tape medium that is to be written to may be retrieved at 540. The operational performance parameters may include one or more characteristics. The one or more characteristics may be located in a non-volatile storage (e.g., a disk, a flash memory). The one or more characteristics may be organized into a defined data structure, such as a table with entries related to bad or slow performance of a given portion. The operational performance parameters may include one or more instructions that are stored in a program or other executable related to the operations that should be performed in response to a characteristic stored in non-volatile storage. For example, a program, module of a program, or other routine in a firmware of a tape drive may be retrieved along with a characteristic.

At 550 it is determined if the next portion to be written is marked as bad. The determination, at 550, may be based on the write command at 510. For example, a given write command may target a first portion of a sequentially accessed tape medium. The given write command may include many bits of data to be written that in the aggregate cannot fit within the first portion of the tape medium. The given write command may be analyzed to determine that the next sequential portion after the first portion is next for writing more bits of data. Determining if the next portion is marked as bad, at 550, may be based on the operational performance parameters, retrieved at 540. For example, a comparison between the retrieved operational performance parameters and the next portion may be made. If there is no entry in the retrieved operational performance parameters that matches the location of the next portion then the determination, at 550, would be no. If there is an entry in the retrieved operational performance parameters that matches the location of the next portion then the determination, at 550, would be a yes and a modification of the command is performed at 555. The command modification, at 555, may include determining the next unclassified portion of the tape medium. For example, by scanning the entries in the retrieved performance parameters to determine the next closed portion.

After the command is modified, at 555 (or if the next portion is not determined bad at 550), it is determined if there is more data to be written at 560. Determining if there is more data to be written, at 560, may include checking a memory of a tape drive system, such as a que or write cache. If there is more data to be written, at 560, method 500 continues to 510 to perform another write of data. If there is no more data to be written, at 560, method 500 continues to finalize the write command at 570. Finalizing the write command, at 570, may include providing a write status regarding the write command to the tape drive. Finalizing the write command, at 570, may include providing a write status regarding the write command to a computer that requested the write. The write status may be that the write was performed successfully. The write status may be that the write failed. Finalizing the write command, at 570, may include saving any updates to a memory related to the tape medium. After finalizing the write command, at 570, method 500 ends.

Figure 6:
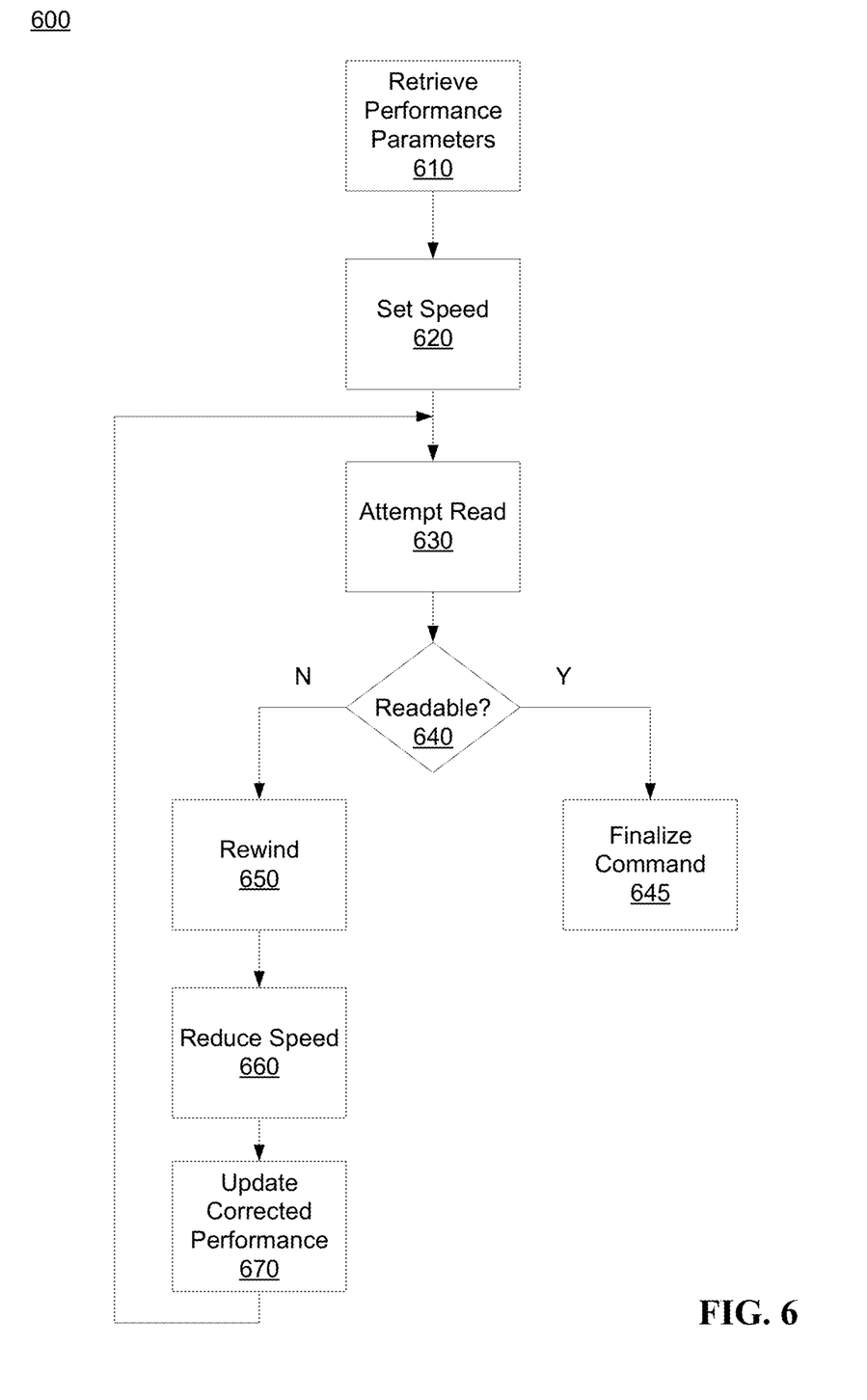
FIG. 6 depicts a flow diagram of an example method for performing access commands consistent with some embodiments of the disclosure.

FIG. 6 depicts a flow diagram of an example method 600 for performing access commands consistent with some embodiments of the disclosure. Method 600 may be executed by a computer system directly, such as a tape drive controller or other logic embedded or otherwise integrated into a tape drive system. Method 600 may be executed by a computer system indirectly, such as by a first computer communicatively coupled by a network (e.g., a local area network, the Internet) to a tape drive. FIG. 2 discloses an example tape drive system 200 capable of performing one or more operations of method 600 consistent with some embodiments of the disclosure.

Method 600 may be performed in response to detecting an access command, such as a read command. At 610 operational performance parameters related to a tape medium that is to be read from may be retrieved. The operational performance parameters may include one or more characteristics related to the tape medium. The one or more characteristics may be located in a non-volatile storage (e.g., a disk, a flash memory). The one or more characteristics may be organized into a defined data structure, such as a table with entries related to bad or slow performance of a given portion. The operational performance parameters may include one or more instructions that are stored in a program or other executable related to the operations that should be performed in response to a characteristic stored in non-volatile storage. For example, a program, module of a program, or other routine in a firmware of a tape drive may be retrieved along with a characteristic.

At 620 a read speed of a tape drive may be set. Setting of the read speed may include setting the speed of a motor that causes linear movement of a tape medium. The read speed may be set, at 620, based on the operational performance parameters, retrieved at 610. For example, a table may include an entry corresponding to a first portion of a given tape drive. The detected read command may also be directed to the first portion. The entry may be used to set the read speed, at 620, before attempting to perform any kind of read operations against a tape medium. This pre-emptive setting of a read speed based on stored operational performance parameters may increase performance by eliminating reading a known degraded or slow portion of a given tape medium above a determined readable speed.

After setting a read speed, at 620, a tape drive may attempt to read data from a tape medium at 630. Reading may include spooling or seeking to a portion or location where the data to be read is stored. Seeking to a portion may include moving to a specific WRAP/LPOS. Attempting to read from a tape medium, at 630, may include causing a read head of a tape drive to attempt accessing data stored in the tape medium. If the data is readable, at 640, method 600 continues to finalize the read command at 645. Finalizing of the read command, at 645, may include providing a read status regarding the read command to the tape drive. Finalizing the read command, at 645, may include providing a read status regarding the read command to a computer that requested the read. The read status may be that the read was performed successfully. After the read command is finalized, at 645, method 600 may end.

If the data is not readable, at 640, the tape medium may be rewound at 650. The Tape medium may be rewound, at 650, to the portion where the read command was attempted, at 630. The read speed may be reduced at 660. The read speed may be reduced, at 660, by setting a parameter of a tape drive. The read speed may be reduced, at 660, stepwise. For example, a given tape drive may have fifty-five tape read speeds from read speed one being the slowest and read speed fifty-five being the fastest. The performance parameters, retrieved at 610, may indicated that the portion of the tape was last successfully read at the thirty-second read speed (e.g., a somewhat middle speed). Performing a stepwise reduction may be setting the read speed to the thirty-first read speed (e.g., a speed only slightly slower than the last known good speed).

At 670 the entry associated with the portion that was attempted to be read may be updated with a corrected performance characteristic. The update of the corrected performance characteristic, at 670, may be an update to a table or other structure. The update of the corrected performance characteristic, at 670, may include the reduced read speed parameter, set at 660. After an update of corrected performance characteristics, at 670, method 600 may again continue to attempt to read the tape medium, at 630, with the reduced speed, set at 660.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for improving tape performance, the method comprising:

detecting an access operation performed by a tape drive on a tape medium, the access operation having one or more performance characteristics;

comparing, in response to detecting the access operation, the performance characteristics of the detected access operation with one or more predefined performance thresholds;

determining, based on the comparing the performance characteristics with the predefined performance thresholds, an operational performance of the tape medium; and updating, based on the operational performance of the tape medium, a table associated with the tape medium, and wherein the table is stored in a non-volatile storage, wherein the table includes a plurality of table entries that describe the performance of a plurality of linear tape positions along the tape medium.

2. The method of claim 1, wherein the predefined performance thresholds are stored in the table associated with the tape medium.

3. The method of claim 1, wherein the non-volatile storage is part of a housing of the tape medium, and wherein the table associated with the tape medium is accessed by the tape drive in response to the tape medium being inserted into the tape drive.

4. The method of claim 1, wherein the non-volatile storage is part of the tape drive.

5. The method of claim 1, wherein the non-volatile storage is in a computer separate from the tape drive, and wherein the updating the table associated with the tape medium includes transferring updates across a network to the computer.

6. The method of claim 1, wherein the access operation is a write operation.

7. The method of claim 1, wherein the access operation is a read operation.

8. The method of claim 1, wherein the method further comprises:
receiving a request to perform a second access operation against the tape medium;
retrieving, in response to receiving the request to perform the second access operation and based on the table associated with the tape medium, one or more tape operation performance parameters; and
executing, based on the tape operation performance parameters, the second access operation against the tape medium.

9. The method of claim 8, wherein the operational performance of the tape medium is that a first portion of the tape medium is operating at degraded performance, and wherein the second access operation is directed towards the first portion, and wherein the tape operation performance parameters indicate that the second access operation should be executed at a reduced speed.

10. The method of claim 8, wherein the operational performance of the tape medium is that a first portion of the tape medium is bad, and wherein the second access operation is directed towards the first portion, and wherein the tape operation performance parameters indicate that the second access operation should be executed on a second portion of the tape medium.

11. The method of claim 1, wherein the method further comprises:
detecting a second access operation performed on the tape medium, the second access operation having a second one or more performance characteristics;
comparing, in response to detecting the second access operation, the second performance characteristics of the detected second access operation with the one or more predefined performance thresholds;
determining, based on the comparing the second performance characteristics with the predefined performance thresholds, a second operational performance of the tape medium; and
updating, the table associated with the tape medium, with the second operational performance of the tape medium.

12. The method of claim 1,
wherein the tape medium includes multiple portions and wherein the table associated with the tape medium includes multiple entries corresponding to the multiple portions, each of the multiple entries include a verification characteristic, and
wherein the updating the table associated with the tape medium further comprises recording an unverified status in the verification characteristic of a first entry of the table associated with a first portion of the tape medium.

13. The method of claim 12, wherein the operational performance is a first operational performance, and wherein the method further comprises:
detecting a second access operation performed on the tape medium, the second access operation having a second one or more performance characteristics, the second access operation directed towards the first portion of the tape medium;
comparing, in response to detecting the second access operation, the second performance characteristics of the detected second access operation with the one or more predefined performance thresholds;
determining, based on the comparing the second performance characteristics with the predefined performance thresholds, a second operational performance of the tape medium,
wherein the second operational performance is related to the first portion of the tape medium,
wherein the second operational performance is similar to the first operational performance; and
updating the first entry of the table associated with the tape medium, wherein updating the first entry includes recording a verified status in the verification characteristic of the first entry.

14. A system for improving tape performance, the system comprising:
a memory, the memory containing one or more instructions; and
a processor, the processor communicatively coupled to the memory, the processor in response to the one or more instructions configured to:
detect an access operation performed by a tape drive on a tape medium, the access operation having one or more performance characteristics;
compare, in response to detecting the access operation, the performance characteristics of the detected access operation with one or more predefined performance thresholds;
determine, based on the comparing the performance characteristics with the predefined performance thresholds, an operational performance of the tape medium; and
update, based on the operational performance of the tape medium, a table associated with the tape medium, and wherein the table is stored in a non-volatile storage, wherein the table includes a plurality of table entries that describe the performance of a plurality of linear tape positions along the tape medium.

15. The system of claim 14, wherein the processor is further configured to:
receive a request to perform a second access operation against the tape medium;
retrieve, in response to receiving the request to perform the second access operation and based on the table associated with the tape medium, one or more tape operation performance parameters; and
execute, based on the tape operation performance parameters, the second access operation against the tape medium.

16. The system of claim 15, wherein the operational performance of the tape medium is that a first portion of the tape medium is operating at degraded performance, and wherein the second access operation is directed towards the first portion, and wherein the tape operation performance parameters indicate that the second access operation should be executed at a reduced speed.

17. The system of claim 15, wherein the operational performance of the tape medium is that a first portion of the tape medium is bad, and wherein the second access operation is directed towards the first portion, and wherein the tape operation performance parameters indicate that the second access operation should be executed on a second portion of the tape medium.

18. A computer program product for improving tape performance, the computer program product comprising a computer readable storage medium having program instructions embodied therewith, the program instructions configured to:
  detect an access operation performed by a tape drive on a tape medium, the access operation having one or more performance characteristics;
  compare, in response to detecting the access operation, the performance characteristics of the detected access operation with one or more predefined performance thresholds;
  determine, based on the comparing the performance characteristics with the predefined performance thresholds, an operational performance of the tape medium; and
  update, based on the operational performance of the tape medium, a table associated with the tape medium, and wherein the table is stored in a non-volatile storage, wherein the table includes a plurality of table entries that describe the performance of a plurality of linear tape positions along the tape medium.

19. The computer program product of claim 18,
  wherein the tape medium includes multiple portions and wherein the table associated with the tape medium includes multiple entries corresponding to the multiple portions, each of the multiple entries include a verification characteristic, and
  wherein the updating the table associated with the tape medium further comprises recording an unverified status in the verification characteristic of a first entry of the table associated with a first portion of the tape medium.

20. The computer program product of claim 19, wherein the operational performance is a first operational performance, and wherein the program instructions are further configured to:
  detect a second access operation performed on the tape medium, the second access operation having a second one or more performance characteristics, the second access operation directed towards the first portion of the tape medium;
  compare, in response to detecting the second access operation, the second performance characteristics of the detected second access operation with the one or more predefined performance thresholds;
  determine, based on the comparing the second performance characteristics with the predefined performance thresholds, a second operational performance of the tape medium,
    wherein the second operational performance is related to the first portion of the tape medium,
    wherein the second operational performance is similar to the first operational performance; and
  update the first entry of the table associated with the tape medium, wherein updating the first entry includes recording a verified status in the verification characteristic of the first entry.

* * * * *